United States Patent [19]

Millington

[11] Patent Number: 5,569,005
[45] Date of Patent: Oct. 29, 1996

[54] TWO-PART DEFORMABLE FASTENER

[75] Inventor: Maurice E. Millington, Sutton Coldfield, United Kingdom

[73] Assignee: Emhart Inc., Newark, Del.

[21] Appl. No.: 373,724

[22] Filed: Jan. 17, 1995

[30] Foreign Application Priority Data

Jan. 18, 1994 [GB] United Kingdom .................. 9400826

[51] Int. Cl.⁶ ........................................ F16B 13/04
[52] U.S. Cl. .................................. 411/34; 411/55
[58] Field of Search ................... 411/34–38, 55, 411/533

[56] References Cited

U.S. PATENT DOCUMENTS

| | | | |
|---|---|---|---|
| 1,497,859 | 6/1924 | Lilly | 411/533 |
| 3,916,970 | 11/1975 | Owens | 411/34 |
| 4,747,737 | 5/1988 | Roffelsen | 411/34 |
| 4,776,737 | 10/1988 | Wollar | 411/55 |
| 4,966,511 | 10/1990 | Lee | 411/55 |
| 5,275,519 | 1/1994 | Hainke | 411/34 |

FOREIGN PATENT DOCUMENTS

| | | | |
|---|---|---|---|
| 994134 | 8/1976 | Australia | 411/38 |
| 3507022 | 8/1986 | Germany | 411/34 |

*Primary Examiner*—Flemming Saether
*Attorney, Agent, or Firm*—E. Murphy

[57] ABSTRACT

A metal fastener for use in attaching parts to a workpiece, for example a car bumper to a car body panel, is made in two pieces, which may be fixed together for example by a force fit, by adhesive or by welding. The fastener comprises a body, a thin walled portion which can be expanded to set the fastener, and two spaced apart head flanges. One of the two parts comprises the body and the other at least one of the head flanges.

8 Claims, 1 Drawing Sheet

U.S. Patent  Oct. 29, 1996  5,569,005

TWO-PART DEFORMABLE FASTENER

This invention is concerned with fasteners for use in attaching parts to a workpiece, in particular in attaching a car bumper to a car body panel.

BACKGROUND TO THE INVENTION

In EP 0 556 993 is described a fastener which is frequently used in the attachment of a bumper to a car body panel.

This fastener comprises a barrel, a first head flange formed on the barrel and spaced from the first, the barrel comprising a plurality of legs extending from an end face of the barrel towards the first head flange, and a setting mandrel which extends through the barrel and has a setting head which engages the end face of the barrel. In use, the fastener is set into a hole in a car body panel by inserting the legs of the barrel into the hole until the first head flange contacts the car body panel, and then putting the setting mandrel while retaining the barrel of the fastener to cause the legs to splay outwardly to secure the fastener in the hole.

This fastener suffers from certain disadvantages. Firstly, it is inherently expensive to manufacture. Secondly firm setting of the fastener in a hole is difficult to achieve particularly if the hole is slightly oversize. Thirdly the set fastener inherently has an axial passageway through it when set. Attempts to prevent the passage of moisture through this passageway by crimping the barrel of the fastener into engagement with a portion of the setting mandrel which remains in the set fastener may reduce this problem, but the fastener requires to be sealed if no possibility of the axial passage of water is to occur.

It is one of the objects of the present invention to provide an improved fastener which does not suffer from the above disadvantages.

BRIEF STATEMENT OF THE INVENTION

The present invention provides a metal fastener for use in attaching parts to a workpiece, for example, a bumper to a car body, which fastener is formed from two parts secured together and includes a body having an axial recess with a closed end and an internal threaded bore adapted to receive a screw threaded setting mandrel. A thin walled cylinder extends from the open end of the body to a barrel portion. A pair of flanges extend radially from the barrel. One of the two parts of the fastener comprises the body and the other of the two parts comprises at least one of the head flanges.

The manufacture of a fastener according to the invention in two parts which are later secured together allows for the most economical form of manufacture for each part to be selected, and thus allows for cheaper manufacture. Further the fastener provides no through hole in the panel when set.

In one embodiment of a fastener according to the invention one of the two parts is provided by the body and the thin walled portion and the other of the two parts by the barrel and the two flanges. In another embodiment one of the two parts is provided by the body, the thin walled portion, the barrel and the second head flange, and the second part by the first head flange. In yet another embodiment one of the two parts is provided by the body and the other by the thin walled portion, the barrel and the two head flanges.

The two parts may be secured together by force fitting, by the use of adhesive or by welding.

The fastener may be of circular or square cross section.

There now follows a description, to be read with reference to the accompanying drawings, of four fasteners embodying the invention.

In the accompanying drawings

FIGS. 1*a* and 1*b* show in longitudinal section two parts of a first fastener in accordance with the present invention;

FIG. 2*a* shows a cross section on II—II of FIG. 1*a* of the first fastener;

FIG. 2*b* shows a cross section corresponding to that of FIG. 2*a* of a second fastener in accordance with the present invention;

DESCRIPTION OF PREFERRED EMBODIMENTS

Figure 1A:
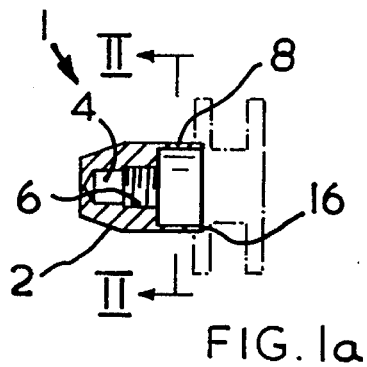

The fasteners shown in the drawings are designed for use in attaching parts to a work piece, particularly a bumper to a car body, and each is formed from two parts formed separately and secured together. The fasteners are formed from metal, e.g. Aluminium, Zinc or similar alloys.

Figure 1B:
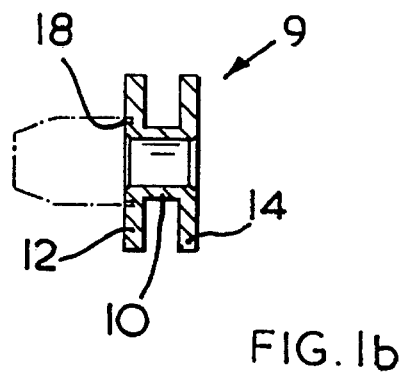
Figure 2A:
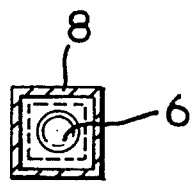

The first fastener [FIGS. 1*a*, 1*b* and 2*a*] comprises a first part 1 comprising a body 2 of square cross section having a closed end axial recess 4 comprising a threaded bore 6. A thin walled portion 8 extends from the body 2 away from the recess 4. The first fastener also comprises a second part 9 comprising a barrel 10, a first head flange 12 extending radially outwardly from the barrel 10 and a second head flange 14 extending radially outwardly from the barrel 10 and spaced from the first head flange 12.

As can be seen from FIG. 2(*a*) the first part 1 of the first fastener is of square cross section, and thus the thin walled portion 8 comprises a square end edge portion 16. The second part 9 comprises, formed in the first head flange 12 a corresponding square recess 18. The cross section of the barrel portion 10 is circular, but could also be square if desired.

The first part 1 of the first fastener may conveniently be made on a multi station cold forger or by casting. The second part 9 of the first fastener is preferably cast, but could be turned if it is of circular cross section. The two parts 1 and 9 of the first fastener may be secured together by the force fitting of the edge portion 16 into the recess 18. This may be supplemented if desired by the use of adhesive or welding.

In use of the first fastener a screw ended mandrel is inserted into threaded bore 6 and the body 2 inserted into an appropriate square hole in a car body panel until the first flange 12 abuts against the panel. Drawing the mandrel away from the panel while holding the flange 12 against the panel causes the thin walled portion 8 to set the fastener in the panel. A further workpiece, e.g. a bumper, can then be mounted by engagement between the two head flanges.

Figure 2B:
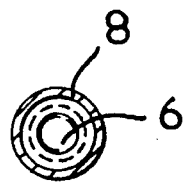

The second fastener is substantially identical to the first fastener except that the thin-walled portion 8 is of circular cross section, as shown in FIG. 2*b*, rather than of square cross section. The assembly and use of the second fastener is thus the same as that of the first fastener though, as the first part of the second fastener is of circular cross section it can, if so desired, be made by turning.

Figure 3:
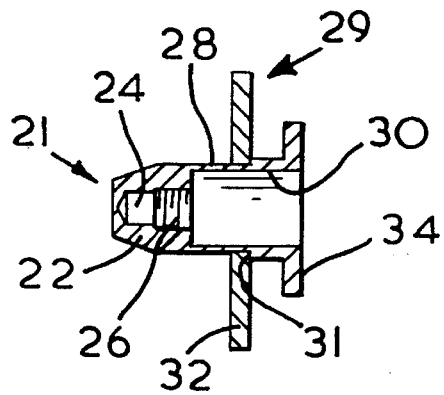
FIG. 3 shows a longitudinal section of a third fastener embodying the invention.

A third fastener is shown in FIG. 3. The third fastener comprises a first part 21 comprising a body 22 of circular cross section having a closed end axial recess 24 comprising a threaded bore 26. A thin walled portion 28 extends from the body 22 away from the recess 24 to a barrel 30. A step 31 is provided between the thin walled portion 28 and the barrel 30, and a second part 29 of the fastener comprises a first head flange 32 which surrounds the portion 28 and abuts against the step 31, extending radially outwardly from the barrel 30. The first part 21 also comprises a second head flange 34 extending radially outwardly from the barrel 30.

Again the second part 29 is preferably a force fit with the first part 21, but security may be enhanced by the use of adhesive or welding.

The third fastener is used in a manner analogous to the first and second fasteners.

The first part of the third fastener can most economically be made by casting, and the second part, being in the form of a disc with a hole in it, by use of an automatic lathe. If a modified form of the third fastener is made where the first part, instead of being of circular cross section is of square cross section, the first part is still best made by casting, while the second part may conveniently be made by stamping.

Figure 4:
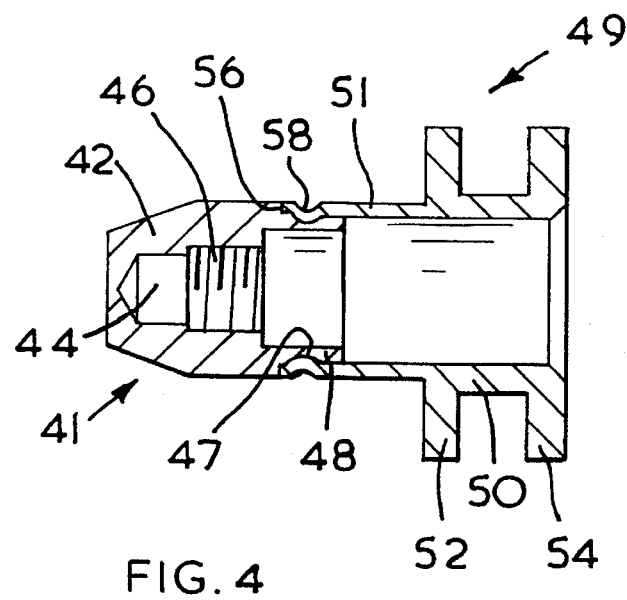
FIG. 4 shows a longitudinal section of a fourth fastener embodying the invention.

A fourth fastener is shown in FIG. 4. The fourth fastener comprises a first part 41 comprising a body 42 of circular cross section having a closed end axial recess 44 comprising a threaded bore 46. A sleeve 48 extends from the body 42 away from the recess 44. The fourth fastener also comprises a second part 49 which comprises a thin walled portion 51 extending to a barrel 50, a first head flange 52 extending radially outwardly from the barrel 50 and a second head flange 54 extending radially outwardly from the barrel 50 and spaced from the first head flange 52.

The sleeve 48 of the first part comprises a circumferential groove 47. The internal diameter of the thin walled portion 51 of the second part 49 is the same as the external diameter of the sleeve 48 of the first part. The fastener is assembled from the two parts by positioning the portion 51 of the second part 49 over the sleeve 48 of the first part 41 until it abuts against a shoulder 56 of the first part, and then swaging the portion 51 into the groove 47 to form a circumferential depression 58.

Again, while the fourth fastener as described is of circular cross section, it can also be of square cross section if required. The first part 41 can readily be made by casting or on a multi station cold forger or, if of circular cross section, by turning on an automatic lathe. The second part 49 is preferably made by casting, but again if of circular cross section could be made by turning.

Setting of the fourth fastener will be understood to be analogous to setting of the first fastener—on setting expansion takes place primarily of that portion of the thin walled portion 51 which is unsupported by the sleeve 48.

I claim:

1. A metal fastener for use in attaching parts to a workpiece, for example, a bumper to a car body, which fastener is formed from two parts secured together and comprises a body having an axial recess with a closed end, which recess comprises a threaded bore adapted to receive a screw threaded setting mandrel a barrel a thin walled portion extending between the body and the barrel the closed end of the body being remote from the barrel a first head flange extending radially from the barrel adjacent the thin walled portion a second head flange extending radially from the barrel further away from the thin walled portion than said first head flange one of the two parts of the fastener comprising the body and the other of the two parts comprising at least one of the head flanges.

2. A fastener according to claim 1 wherein one of said two parts comprises the body and the thin walled portion and the other of the two parts comprises the barrel and the two flanges.

3. A fastener according to claim 1 wherein one of the two parts comprises the body, the thin walled portion and the barrel and the other of the two parts comprises the first head flange.

4. A fastener according to claim 1 wherein one of the two parts comprises the body and the other comprises the thin walled portion, the barrel and the two head flanges.

5. A fastener according to claim 1, wherein the two parts are secured together by welding.

6. A fastener according to claim 1 wherein the two parts are secured together by one part being a force fit into a recess in the other part.

7. A fastener according to claim 1 in which the body and the thin walled portion are of circular cross section.

8. A fastener according to claim 1 in which the body and the thin walled portion are of square cross section.

\* \* \* \* \*